March 3, 1959 P. J. FRICKERT ET AL 2,875,503
FIBROUS MATS AND PRODUCTION THEREOF
Filed Dec. 27, 1955 6 Sheets-Sheet 1

INVENTORS
PHILIP J. FRICKERT &
BY GEORGE E. SMOCK

ATTORNEYS

March 3, 1959 P. J. FRICKERT ET AL 2,875,503
FIBROUS MATS AND PRODUCTION THEREOF
Filed Dec. 27, 1955 6 Sheets-Sheet 2

INVENTORS
PHILIP J. FRICKERT &
BY GEORGE E. SMOCK

ATTORNEYS

March 3, 1959 P. J. FRICKERT ET AL 2,875,503
FIBROUS MATS AND PRODUCTION THEREOF
Filed Dec. 27, 1955 6 Sheets-Sheet 3

INVENTORS
PHILIP J. FRICKERT &
BY GEORGE E. SMOCK

ATTORNEYS

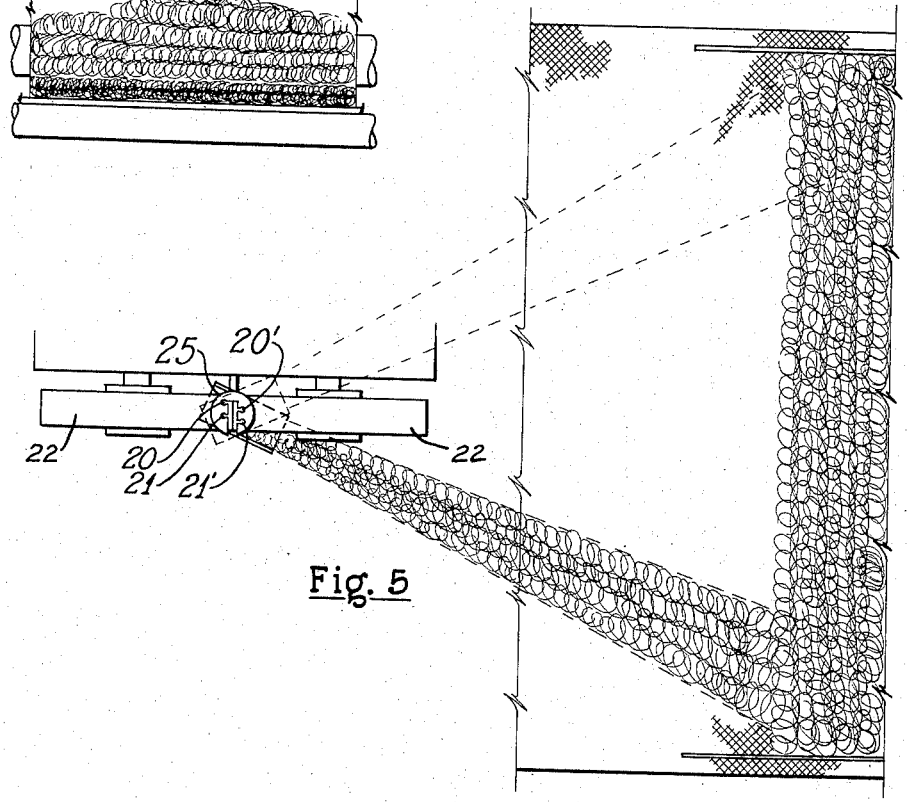

March 3, 1959  P. J. FRICKERT ET AL  2,875,503
FIBROUS MATS AND PRODUCTION THEREOF
Filed Dec. 27, 1955  6 Sheets-Sheet 5

INVENTORS
PHILIP J. FRICKERT &
BY  GEORGE E. SMOCK
ATTORNEYS

March 3, 1959 P. J. FRICKERT ET AL 2,875,503
FIBROUS MATS AND PRODUCTION THEREOF
Filed Dec. 27, 1955 6 Sheets-Sheet 6

INVENTORS
PHILIP J. FRICKERT &
BY  GEORGE E. SMOCK

ATTORNEYS

United States Patent Office 2,875,503
Patented Mar. 3, 1959

2,875,503

FIBROUS MATS AND PRODUCTION THEREOF

Philip J. Frickert, Anderson, S. C., and George E. Smock, Newark, Ohio, assignors to Owens-Corning Fiberglas Corporation, Toledo, Ohio, a corporation of Delaware Application December 27, 1955, Serial No. 555,412

23 Claims. (Cl. 28—1)

The invention herein set forth is related to the invention disclosed in a copending application, Serial No. 351,000, now Patent 2,736,676 filed on April 24, 1953, in the name of Philip J. Frickert, Jr., wherein a method and means are disclosed for making a new type of continuous strand mat, the principles of which are put to further use in the present invention.

As set forth in the copending application, a fibrous mat product may be produced by drawing continuous filaments of material such as glass from a forming feeder and gathering them into an integral strand and then imparting a high linear velocity to the strand to cause it to be redirectioned to a collection surface upon impingement against a deflecting member. The deflecting surface is cyclically varied in its orientation with respect to the path of the strand to cause the strand to be laid into an accumulation according to a predetermined width and depth pattern determined by the conveyor dimensions and its linear speed. The deflected strand can be optionally given a dispersed or fuzzy form by regulating its speed of impingement against the deflecting surface and regulating the amount of sizing fluid supplied to the filaments as they are gathered to form the strand.

It is an object of the present invention to provide a production system wherein the above-described principles are embodied into an economically operable production line adaptable to provision of a range of selectable properties in the products produced thereby.

It is another object of the invention to produce a new continuous strand product in which strands may be incorporated in varying predetermined controlled degrees of fiber dispersion to permit preselectable mat properties.

It is still another object of the invention to provide a method and means for the manufacture of a new continuous strand mat product in which a plurality of newly formed fine strands are introduced directly in the forming process into a mat consisting of an accumulation of swirled strand portions.

It is another object of this invention to provide a system for manufacturing continuous strand mats in which consistency and uniformity of density and porosity between randomly selected small areas can be assured.

Although the principles of the present invention are described as applied in the use of glass strands, the invention is not limited thereto in view of the fact that it has aspects readily applicable to use with strands, yarns and other forms of different materials. For example, the described method of effecting strand distribution can be used for distribution of yarns or slivers as well, or may be used for distribution of strands, yarns or slivers of materials such as cellulose acetate, artificial silk, cotton wool or nylon.

Other objects and features characteristic of the invention are set forth with particularity in the appended claims. The invention, however, both in organization and the manner of construction together with further objects and advantages thereof may be best understood by reference to the following description taken in connection with the accompanying drawings, in which:

Figures 1 and 2, in combination, show a completely integrated multi-stage production line for manufacture of continuous strand mats in accordance with the present invention with Figure 1 showing the forming stages of the line and Figure 2 showing the remainder thereof;

Figure 5 is a rear elevational view of the apparatus illustrated in Figure 4;

Figure 6 is a top plan view of the apparatus of Figure 4;

Figure 1:
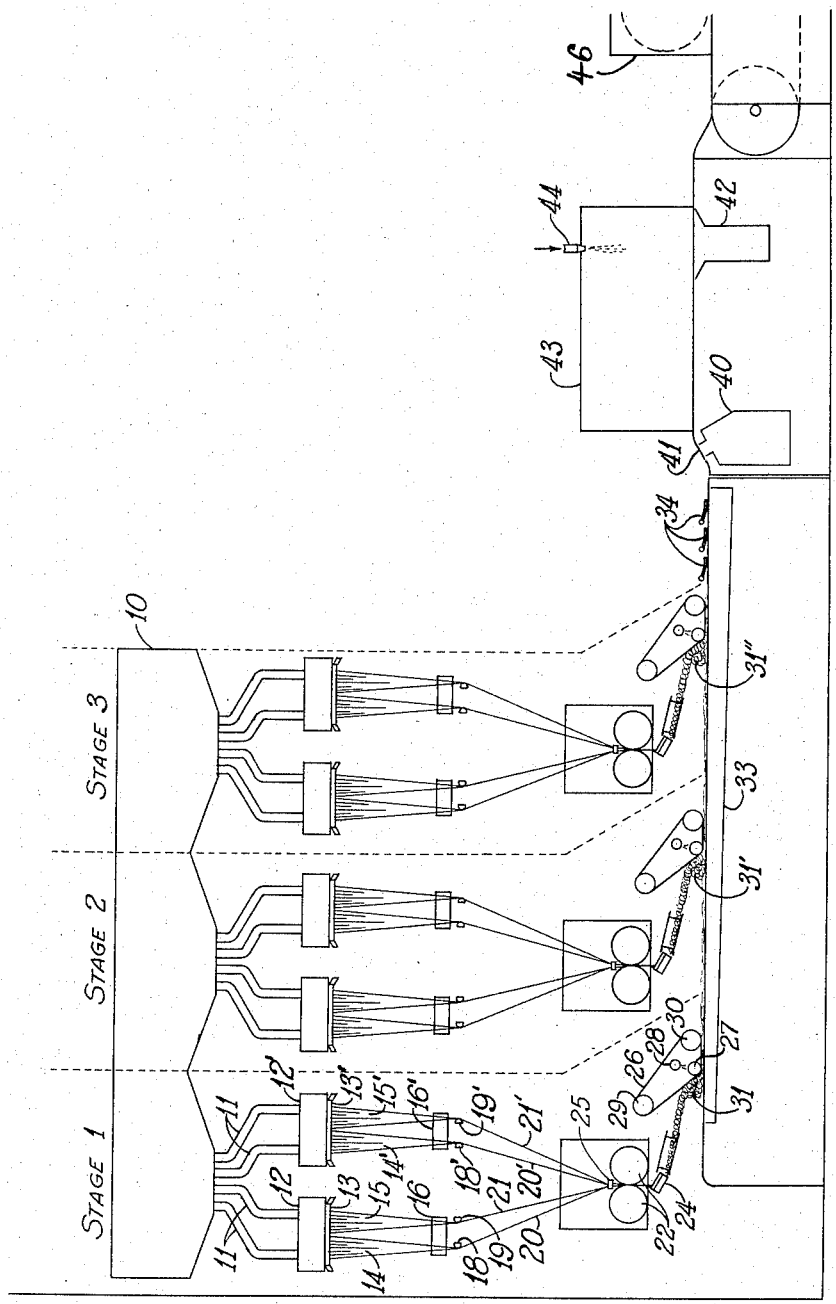
Figure 3:
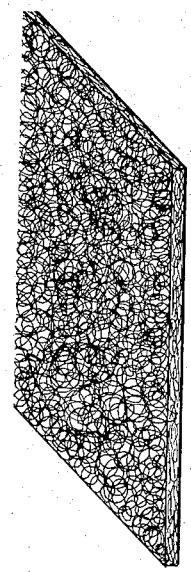
Figure 3 is a plan view of a piece of continuous strand mat produced in accordance with the invention.
Figure 2:
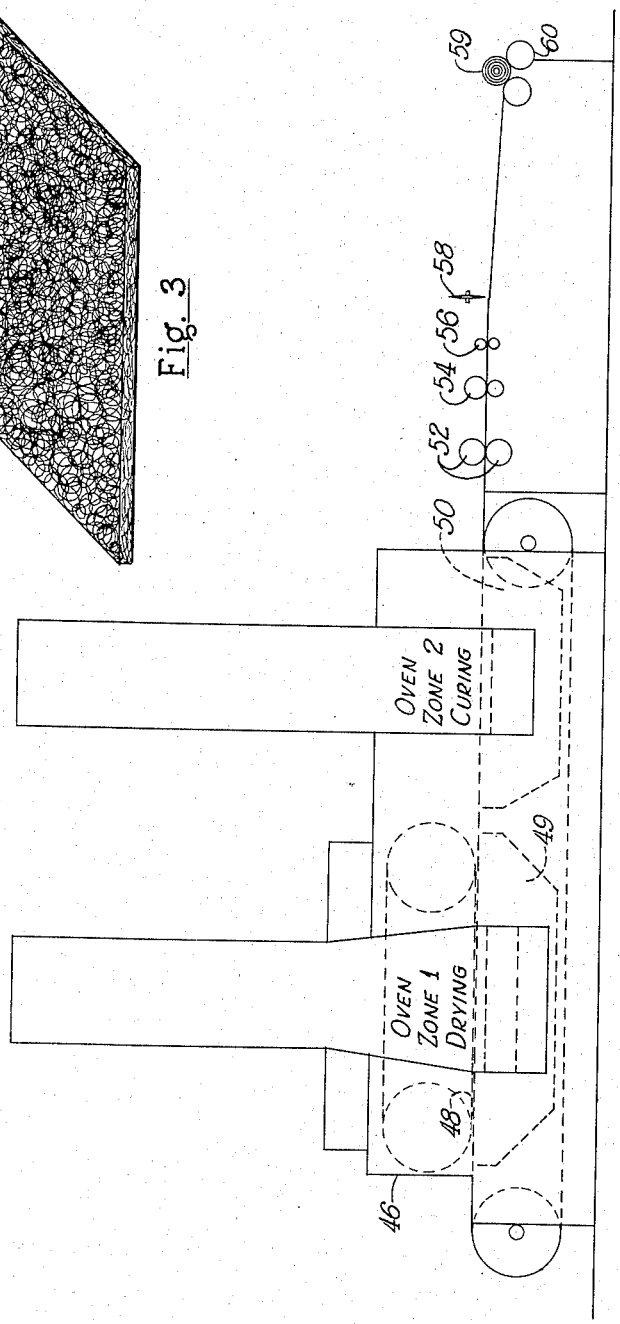

Turning to the drawings in greater detail wherein identical reference numerals are used in referring to similar parts, Figures 1 and 2 show a complete production line for the manufacture of continuous strand mats including three similar stages of strand introduction which are arranged in series, or tandem relationship along the length of the line. The three stages of introduction comprise a first stage in which a bottom layer of continuous strand is laid directly on the conveyor, an intermediate stage and a third stage in which a middle and top layer of continuous strand, respectively, are deposited in sequence over the first or bottom layer. The three stages are designated as stage 1, stage 2, and stage 3 and follow each other in corresponding sequence on the line depositing strand accumulations 31, 31' and 31", respectively, to make up a mat product. The strands although capable of being produced from any of a variety of resin and mineral materials are preferably formed of material such as glass which is adapted to the formation of continuous filaments at high rates of speed. When the material is glass, it may initially be in the form of marbles which can be supplied from a common marble hopper 10 through chutes 11. From the chutes the marbles are introduced into the melting units of all three stages. The melting apparatus in each stage consists of a pair of electrical melting units 12, and 12' and associated feeders 13 and 13', respectively. The glass attenuated into filaments from the feeders are divided into two groups; namely, groups 14 and 15 from feeder 13, and groups 14' and 15' from feeder 13'. Each pair of these groups are drawn over a common roll-type sizing applicator; namely, applicators 16 and 16', before being gathered into the form of strands 20, 21, 20', and 21' over gathering members 18, 19, 18', and 19', respectively.

The strands 20 and 21 are drawn through a guide eye 25 along with strands 20' and 21' of the second half of the forming stage. All four strands produced in each stage are pulled by a single pair of mated pulling wheels 22 (see Figures 4 to 6). The strands are pulled in spaced parallel alignment and are imparted sufficient kinetic energy that when driven against an oscillating deflector unit 24 they are deflected and deposited in accumulated relation between the conveyor 35 and an overhanging flight formed by a mesh-type foraminous chain 26 inclined downwardly toward the conveyor 35. The chain 26 is as wide as the conveyor line on which the strand is deposited and is supported by an upper level roll 29 and a pair of forwardly located lower level rolls 27 and 30 disposed a slight distance above the conveyor. The rolls 27 and 30 are movable up and down which feature may be used to effect a gauging of the thickness of the material laid on the conveyor, if desired.

The roll 30 is powered to drive the chain 26 while a spray tube 28 located in the space bounded by the chain 26 is disposed above the roll 27 to spray or pour a compacting liquid such as water thereover for transfer over the accumulation of strand 31 between the upper and lower chains 26 and 35, respectively. Water supplied from the tube 28 flows over the roll 27 and through the chain 26 and onto the accumulation of strand thereunder to effect compaction of the accumulation by weight of the water. The roll 30 is arranged on pivotal supports 37 so that it can be brought into very close contact with the material to press the accumulation of strand passing thereunder and thereby squeeze out excesses of water in the accumulation 31. The chain 26 and the conveyor 35 both move in the same linear direction acting to wedge the accumulation 31 under the flight beneath the rolls 27 and 30. Any excess liquid squeezed from the accumulation drops through the conveyor chain into a drain pan 33 located under the conveyor 35. The drain pan extends under all three stages of introduction of strand. After passage through the fluffed strand accumulations, water excesses collected in the drain pan may be recirculated, if desired. Although the invention is here described in relation to supply of water to the fibrous accumulation for compaction purposes, it will be readily understood that other liquids may be used similarly to not only accomplish mat compaction but also the surface treatment of glass fibers within the mat.

The mat 32 comprising the three layers of strand, after emission from the third and last stage of water compaction, is still heavy with water even after being squeezed by the flights. A number of ironing pads 34 comprising flexible rubber sheets or flaps supported from an overhanging position above the mat 32 are used to wipe over the surface of the mat and press out still more water therefrom. This water is also collected in the drain pan 33. After being pressed by the flexible pads 34, the mat 32 is passed over an exhaust chamber 40 which again withdraws water from the mat before the mat is introduced into a binder supply hood 43. The hood is provided with one or more jet-type binder sprays which spray binder on the mat across its complete width. While the mat is being sprayed with the binder, an exhaust chamber 42 immediately under the spray section acts to distribute the binder through the thickness of the mat as well as withdraw excesses which are collected and recirculated for subsequent respraying. Although the spray jets 44 are a convenient means by which binder may be distributed over and through the mat 32, it will be understood that other means can be provided as described hereafter.

Upon emission from the binder hood, the mat 32 is advanced by the conveyor system through an oven 46 in which the mat is heated by passage of air therethrough to dry the mat and to cure the binder. On introduction to the oven 46, the mat 32 with the binder distributed therethrough is drawn through the space between an upper flight 48 and the conveyor itself. Hot air is forced upwardly through the conveyor mat to effect a drying thereof in an oven drying zone 1. The air on being forced up through the mat acts to lift the mat upwardly against the upper flight 48. The flight is arranged to have a relatively smooth close-meshed surface in order to impart a correspondingly relatively smooth surface to the top of the mat. The flight 48 and conveyor are adjusted to move forward at the same speed and to deposit the mat into a second oven zone in which the air is drawn downwardly through the mat to effect a cure of the binder therein. The upward flow of air in zone 1 is produced by provision of a positive pressure draft chamber 49 below the conveyor while the drawing of the hot air downwardly in zone 2 is effected by a corresponding negative pressure chamber 50 also below the chamber 49.

On emission from the oven, the cured mat may be passed between a pair of cooled rolls 52, if desired. These rolls which are cooled by means such as internal circulation of cool water are of considerable value in cooling mats which contain thermoplastic binder materials. The rolls in these instances set the binder to make the mat more readily handleable.

After leaving the cooling rolls, the mat is carried through spaced slitter knives 54 to divide it into strips or to trim its edges as desired in accordance with specific job specifications. A pair of tension rolls 56 act to draw the mat through the oven and maintain it in tension to prevent wrinkles from being imparted thereto during the drying and curing as well as operations subsequent thereto. After passage through the tension rolls 56, the mat sections are cut to desired length such as by a cut-off blade 58 which is suitably driven by pneumatic means or the like. The blade 58 is a disc-type blade in pressure contact with the conveyor surface over which the mat is moved and is arranged to traverse the mat with a rapid stroking action to cut it to the length desired. Upon being carried further forward, the successive lengths of mat are rolled up into package form, such as a roll 59, by roll-up apparatus 60 to make it ready for shipment or further processing in subsequent fabrication steps.

Figure 4:
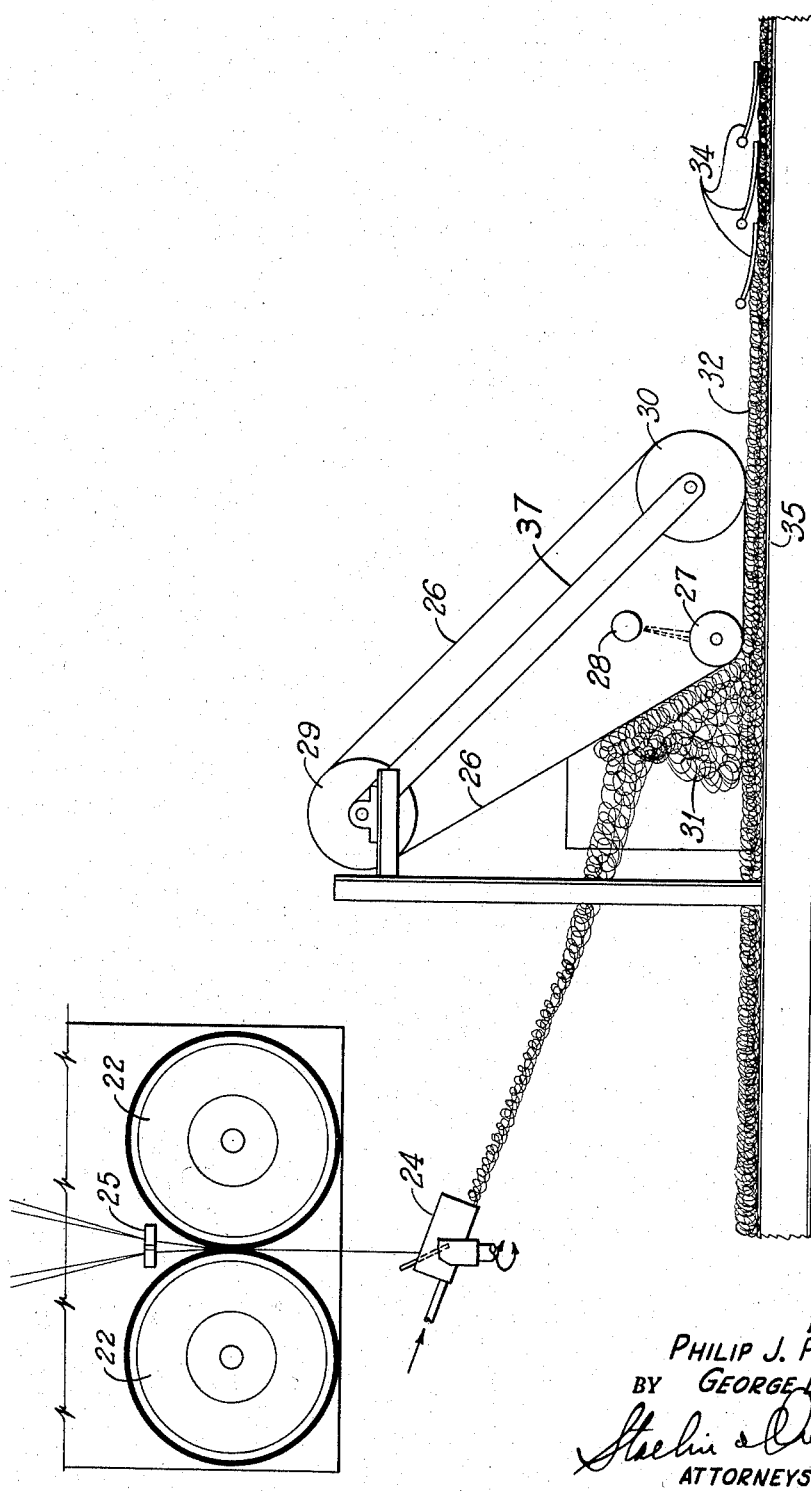
Figure 4 is an enlarged side elevational view of a strand-introduction stage of the apparatus illustrated in Figure 1.

Now having described the apparatus and its operation generally, the last stage of strand deposition is shown in more detail in Figure 4 and is referred to for a more detailed description of the method of forming the mat 32. This stage is identical to the first two stages of strand deposition except that the mat, instead of having a subsequent layer of strand applied thereover after passage under the overhanging conveyor 26, is pressed by a series of pads 34.

It has been found that more than one strand can be arranged to be drawn in closely aligned relation through a pair of coacting pulling wheels for deflection from a single deflection unit 24 without snagging or otherwise causing a disturbance in continuity of control over the strands in their passage to the collection zone. Each of four strands can be drawn through the pull wheels and imparted sufficient kinetic energy to effect deflection from the unit 24 with the three other strands at speeds ranging from 3,000 feet per minute and up. By being allowed to pull four strands simultaneously through a single pair of pull wheels, a lesser number of zones of deposition are required for production of a mat of given thickness. In another sense, this means less apparatus for attenuating and deflecting the strands and greater compactness in the production line as a whole.

Figure 5 shows the top of a pair of pulling wheels 22 with the four strands 20, 21, 20' and 21' being introduced thereto in spaced relationship through the guide eye member 25. It will be seen that the guide eye is shaped with notches formed in staggered spaced relationship on opposite sides of the inner periphery of a cut-out portion to properly introduce the strand guided therethrough in the spaced relation desired on their passage through the pull wheels. The four strands are caused to impinge the deflector unit 24 in correspondingly spaced relationship and to be deflected therefrom as an inter-associated flowing mass of continuous strands each of which assumes a somewhat helically swirled form and is thrown forwardly into the accumulation in the collection zone.

Figure 6 shows the general relation of the pull wheels 22 to the guide eye 25 and deflector unit 24 when viewed from the rear of a stage of strand deposition, one wheel being removed for clarity. This figure shows more clearly the spaced relation of the strands on passage through the pull wheels and the maintenance of such spaced relationship on impingement against the deflector unit.

The division of filaments from a given feeder into two individual groups or strands each having a lesser number of filaments therein also imparts the property of fineness to the mat in that it eliminates what would otherwise be heavy ropey strand in the final mat product. This also results in providing small area uniformity and many more interstices in the mat product.

By way of example, the strands can be pulled satisfactorily through pulling wheels while spaced from each other distances as small as 1/15 inch at speeds as high as 15,000 feet per minute and more. Thus, the pull wheels for a zone of deposition such as illustrated need not be more than 3/4 inch wide while the diameter of wheels for such purpose may be in the order of 1 foot.

Figure 7:
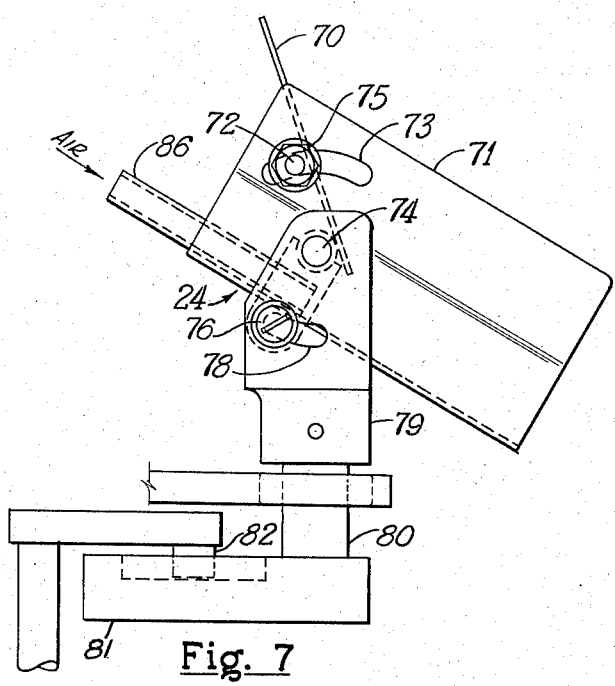
Figure 7 is an enlarged side-elevational view of a deflector unit of the type used in the apparatus illustrated in the previous figures.
Figure 8:
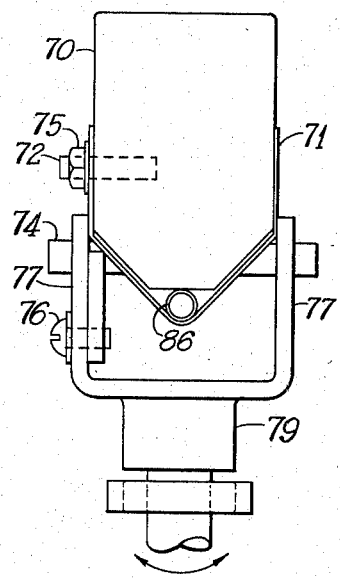
Figure 8 is a front-elevational view in part of the deflector unit of Figure 7.

Figures 7 and 8 show in greater detail the deflector unit 24 itself. The unit comprises a primary deflector plate 70 mounted in adjustable angular relation within a generally U-shaped strand-channelling member 71 having a longitudinal dimension such that it acts somewhat like a trough to redirect and guide the strand deflected from the plate 70. The member 71 might also be viewed as a secondary deflector since strands deflected from the plate 70 are redirected by the member 71 for a more appropriate angle of throw of the strand to the zone of accumulation on the conveyor.

The member 71 is mounted in angularly positionable relation in an oscillatable mounting bracket 79 which is also of generally U-shaped configuration. The member 71 is supported in a bracket 79 by a transverse pivot rod 74 which extends across the distance between the two legs 77 of the mounting bracket 79 generally in the lower portion of the rear end of the member 71 and is pivotable about the bar 74 to permit adjustment thereof to various angles with respect to the horizontal. The primary deflector 70 is also pivoted about the bar 74 and may be provided any of a range of angles with respect to horizontal by moving the upper end thereof through the desired angle about the bar 74 which acts as an axis. A nut 75 associated with an adjusting screw 72 which projects through an arcuate slot 73 in the side of the member 71 may then be tightened to fix it in place. The range of movement of the trough member 71 is correspondingly determined by the position in which a screw 76 is tightened against the edges of an arcuate slot 78 in a leg of the bracket 79 which establishes the range through which the secondary deflector may be angularly related to the horizontal.

The entire deflector unit is mounted on a vertical shaft 80 which may be oscillated about the vertical axis of the shaft within a predetermined angle of traverse by movement of a horizontal arm 81 fixedly associated with the end of the shaft 80. The arm 81 is provided a cam following contour and may be engaged by a cam 82 driven by a motor (not shown) to effect oscillation of shaft 80 through the predetermined desired angle. By way of example, satisfactory oscillating speeds for uniform mats have been found to lie in a range of from 35 cycles to 120 cycles per minute and in some circumstances higher oscillating speeds have proven desirable.

As indicated previously, a deflected strand may be retained in an integral condition or caused to be dispersed. Control of this property is dependent primarily upon three factors; namely, the speed of the strand on impingement against the primary deflector, the amount of fluid applied to the filaments at the roller applicators before collection into the form of a strand, and the angle of the primary deflector plate. Still further by way of example, it has been found that for a rate of oscillation of the deflector unit of 100 cycles per minute, with fluid applied to the filaments at a given rate, and the angle of the primary deflector set at 75° to horizontal, that the deflected strands retain their integrity; while for primary deflector angles of 65° and 55°, the strands were deflected in a medium dispersed condition, and a more fully dispersed condition, respectively. Thus, the primary deflector, for a given linear speed of the strand, is adjustable to cause the deflected strand to either retain its integrity or to assume a dispersed condition.

The member 71 is angularly adjustable with respect to the horizontal to enable the strand to be thrown to the collection zone with the residual energy of motion existing therein after deflection from the primary deflector 70. To further facilitate the throwing of the strand to the collection zone, the deflector unit 24 is provided with an air jet tube 86 which extends from the rear of the secondary deflector to a point just under the primary deflector. The primary deflector plate 70 is cut short of the bottom of the secondary deflector so that air emitted from the tube 86 flows forwardly into the zone where the strand deflected from the plate 70 impinges the secondary deflector 71. Thus, the air emitted from the tube 86 can be used to aid in throwing the strand deflected from the plate 70 to the area desired when it has insufficient kinetic energy to carry itself forwardly to such zone from the channelling member 71.

In its action to aid in throwing the strand forward, the air tube is, in a sense, an amplifier, which may be used to aid in throwing the strand from the deflectors in such instances where greater mat width is desired for a given assembly of deflectors, i. e., where the kinetic energy in the strands is insufficient to effect the desired distance of throw from the deflector unit. In addition to aiding in throwing the strand forward, the air tube aids in clearing the secondary deflector and prevents hang-up which might otherwise be caused by sizing build-up on the secondary member 71. The air tube is especially useful when the angle of the primary deflector plate 70 is small with respect to the horizontal, such as when the angle of impingement is set for a high degree of dispersion of filaments within the strands. Still further, the air tube is also useful in imparting a higher degree of throw, (i. e., movement of the strand with greater kinetic energy) where it becomes desirable such as for making mat products of the type illustrated in Figure 12 described in greater detail hereafter.

The strand thrown from the deflector unit 24 is deposited on the under side of the overhanging chain flight 26 and where it is accumulated until a sufficient amount is built up to cause the accumulation to drop by its own weight onto the previous layers of strand on the conveyor 35. Accumulations of continuous strand are successively deposited on the conveyor in this manner to build up a more uniformly distributed layer of strand mat. A general downward inclination of the chain 26 forms, in a sense, a wedge within which the accumulations of strand are squeezed upon deposition on the conveyor. Thus, a squeezing or compaction of the deposited strand is effected by the overhanging chain, in addition to providing a secondary zone of deposition within which the strand can be collected as an accumulation in expanded condition to impart a greater uniformity to promote uniformity of distribution.

The overhanging chain 26 is arranged to move slightly slower than the conveyor chain 35 to redistribute the surface fibers of the layer being compacted because it has been found that such differential in speed imparts a smoothness to the top-most surface on passage under the chain in the area where it is backed up by the roll 30. Further in this respect, it has been found that if the felting chain moves faster than the conveyor, the upper surface becomes wrinkled in the final product, while if linear speed of the felting chain and conveyor are the same, the surface is not as smooth as when the speed of the felting chain is slightly slower. Pressure to squeeze out the water collected in the layers of strand passed under the felting chain is assured by appropriate spacing of the back-up rolls 27 and 30 in close proximity with the surface of the conveyor 35. The spacing between the rolls 27 and 30 and the conveyor 35 is dependent upon the thickness and degree of compaction desired in the final mat product and varies from stage to stage as the pack becomes built up. The related rolls 27 and 30 may be disposed at slightly different levels, if desired, to cause a gradual squeezing of the mat as it passes through each stage.

Water in each stage is sprayed onto the roll 27 for transfer through the felting chain to the accumulation of strand being laid thereunder. The water compacts the strand and prevents it from regaining some of its original thickness after passage under the back-up roll 30. It has been found that if fluid is not collected in the accumulation to effect such compaction, the layer of strand would regain one third or more of its original thickness after passage through the compacting zone. Such compaction also effects a smoothening of the surface of each layer for layers of strand which may be deposited thereon subsequently. It should be noted, however, that besides being dependent upon the spacing between the back-up roll 30 and the conveyor 35, the thickness of the mat is also controllable by regulating the speed of the conveyor and the rate of deposition of strands in the collection zone. Again by way of example, satisfactory products have been formed at conveyor speeds in the order of 6 feet per minute for a mat having a weight of 2 ounces per square foot, and in the order of 16 feet per minute for a mat of ¾ ounce per square foot.

The thickness of a mat producible by deflection of strand from a single oscillating deflector unit, it has been found, is somewhat limited since for a thick mat the strand accumulation is required to be built up in height, but the accumulation is simultaneously built backward toward the deflector unit 24 to such an extent that any additional quantities of strand emitted from the deflector and deposited in the accumulation are not thrown as far forwardly as the initial quantities.

Figure 5 illustrates graphically that as the accumulation in the collection zone builds up, it builds up in a direction toward the pull wheels and that the width across which the deflected strand is traversed as this build-up occurs is narrowed along the lines in the area defined by the dotted lines. That is, the limits on the width of the mat as the accumulation builds up, corresponds to the angle through which the deflection unit is oscillated.

As the zone of accumulation extends backwardly from the overhanging conveyor chain 26 with the deposition of greater quantities of strands for thicker mats, the transverse sweep of the strand is reduced resulting in formation of a mat narrower in width than the conveyor.

To overcome this difficulty in the production of wide thick mats, a series of relatively thin layers of strand are laid on top of each other as herein described to make a single, wide, integral mat of thick dimension. By this method, the strand accumulation in the collection zone for each stage of production need only be that which corresponds to a thin mat and the full width of the conveyor for a given angle of oscillation of the deflector unit can be utilized.

In other words, by making a thin mat in multiple layers, wider thick mats can be produced since each layer is made with less build-up in the collection zone of each stage. It has been found that in practice mats made up of layers of strand, each of which is up to ⅛ inch in thickness, can be conveniently manufactured without undue limitation on width. It has also been found that for all practical purposes the final product gives no physical indication of being laminar but for all practical purposes is identical to a truly integral single layer mat. The width of the mat produced under these conditions may be in the order of 60 inches while the thickness is dependent upon the number of layers packed on top of each other.

After collection of three layers of strand to form the mat 32, it has been found that if the top surface of the mat is not worked such as by pads 34, the mat will puff up in the oven to present an undesirable final surface condition. The action which takes place when the flexible pads 34 pass over the top surface of the mat is not fully understood, but it is believed that the pads press or iron out the air contained within the interstices of the mat. The pads are flexible rubber strips which extend across the width of the line and are about one foot wide and $\frac{3}{32}$ of an inch thick. With these dimensions, sufficient weight exists in the pads to effect the desired pressing out of thin mats. For thicker mats, the pads can be weighted for the pressing action.

After being subjected to pressing by the pads 34, the mat is passed over the exhaust chamber 40. The water in the mat at this stage may be three times the final weight of the mat and may be reduced to within twice the final weight of the mat by use of the exhaust chamber. It is not desired that all the water be removed from the mat since the presence of water aids in subsequent dispersal of binder through the mat. The withdrawal of water from the mat is accordingly made controllable by providing a slot 41 which is adjustable in width immediately under the conveyor. Consequently the withdrawal of water may be matched to that desired to effect the proper dispersion of subsequently supplied binder.

After passing over the exhaust chamber 40, the mat is introduced into the binder hood 43 where it is supplied with an aqueous binder solution applied directly thereto such as by one or more spray nozzles 44. A wide variety of binder materials may be used such as starch, gelatin, phenolics, polyesters, polystyrene, polyvinyl acetate, melamine, acrylic acid and butadiene styrene latex. By way of example, usually from ⅛ to 15% solids are incorporated in water systems. It will be recognized, however, that other binder materials emulsifiable or soluble in water may also be utilized. In many instances mats are made for use in plastic laminates. In such instances, the binder is selected for its characteristics of solubility in the resin with which it is to be associated.

The binder is preferably atomized in the binder hood to get penetration and to prevent compaction by the weight thereof. Upon passage into the curing oven 46, the wet mat is, in effect, first dried and then subsequently cured. In this respect, the oven may be divided into two zones, the first zone in which the mat is treated primarily to effect a drying, and the second zone to effect the cure.

Under circumstances where the mat product is to be of a more fluffy, less dense character such as for filter packs, rather than for plastic laminate structures, water compaction of the strands to impart density thereto is not always desirable. The overhanging flight or felting chain in the strand deposition stages may instead be located from one to three inches above the conveyor to effect a waterless compression of the pack for the thickness desired. Since no water is utilized under these circumstances, the upper flight acts more to gauge the thickness of the final mat product. The top flight 48 in the oven 46 is set for the final thickness desired. Since no water is used for compaction under these conditions, no pressing or water exhaust facilities are needed. Also under these conditions, the binder applied in the binder hood is preferably atomized and distributed in the binder hood as a fog in order to get maximum penetration through the pack and to prevent undue compacting of the pack by otherwise heavier solutions binder. The binder is atomized by a suitable means such as a conventional atomizing head instead of the spray nozzle 44. By way of example, bonded packs approximately ½ to 1 inch thick having a density of ½ to 1 ounce per square foot have been made satisfactorily by this means but are by no means the limits of the process.

Figure 9:
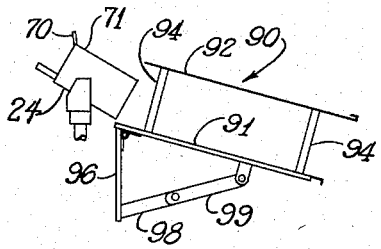
Figure 9 is a side-elevational view of the deflector unit of Figures 7 and 8 in association with a tertiary deflection plate unit.
Figure 10:
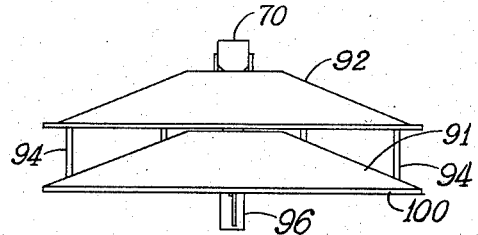
Figure 10 is a front-elevational view of the tertiary plate unit of Figure 9 in association with the deflector unit.

Figures 9 and 10 show in greater detail an environmental control unit or what might be termed, in another sense, a tertiary deflector unit, which can be used in conjunction with the deflector unit 24 as shown in Figure 1 as well as Figures 9 and 10 to provide a still greater uniformity of distribution and pattern in the strand deposited in each layer of the mat 32. The unit 90 acts as an environmental control unit by reducing the effects of turbulence which might otherwise be produced by air flowing in a vertical direction transverse to the paths of strands ejected from the channelling member 71. This unit also aids in establishing a straight line deposition of the strand in the collection zone under the overhanging chain 26 by providing a leading edge which guides the strand in a straight horizontal line transverse to the direction of travel of the conveyor upon ejection of the strand therefrom.

The unit 90 includes a main lower plate 91 disposed immediately under the exit end of the channelling member 71 of unit 24 in extending in a downwardly inclined direction toward the zone of deposition of the strand below the overhanging chain 26. The plate 91 is hingedly supported on a fixed backing member 96 to permit angular positioning of the member 91 with respect to horizontal by connected adjustment members 98 and 99 which extend from a forward point under plate 91 to the backing support member 96. By this arrangement, plate member 91 may be fixed to any of a range of angles with respect to the strand ejected from the unit 24. The plate 91 is flared generally outwardly in a transverse direction to the path of the strand from the unit 24. The back end of the plate is required to be only as wide as the zone of ejectment of the strand from the unit 24 as it oscillates to deposit strand on the upper surface of the plate 91. The forward edge of the plate is as wide as required to accommodate the strand for the angle of oscillation of the unit 24 extended forwardly from the zone of deposition thereon. The strand upon deposition on the upper surface of the plate 91 is carried forwardly as the path is oscillated back and forth across the width of the plate 91. It is caused to be lifted slightly from its normal trajectory by the leading edge 100 of the plate. In the center portion the trajectory is not lifted as much as at the extreme edges and accordingly the strand, upon leaving the leading edge 91, is caused to have a more level path across the width of the conveyor and is caused to be deposited in a more straight line rather than an arcuate line on accumulation in the collection zone.

An upper plate 92 is provided in the unit 90 to reduce extraneous air flow about the path of the strands ejected from the unit 24. In this respect, the plate 92 is a baffle. It is spaced above the plate 91 by spacer members 94 fixed between the two plates 91 and 92. The general configuration of the plate 92 is similar to that of plate 91 and is arranged to be generally parallel to the plate 91. In addition to reducing air flow about the path of the ejected strand, the upper plate 92 also acts as a protective surface against extraneous drippings such as sizing material which might accidently be dropped from the pulling wheels in the strand forming operations. Thus, the plate 91 is kept relatively clear of extraneous matter to assure a free path for passage of strands thereover.

The tertiary deflecting unit 90 may or may not be used as needs dictate. It might generally be considered a refinement unit with respect to the product produced in that it promotes a more uniform pattern of distribution and orientation of fiber portions within mat products made by the equipment of the invention.

Figure 11:
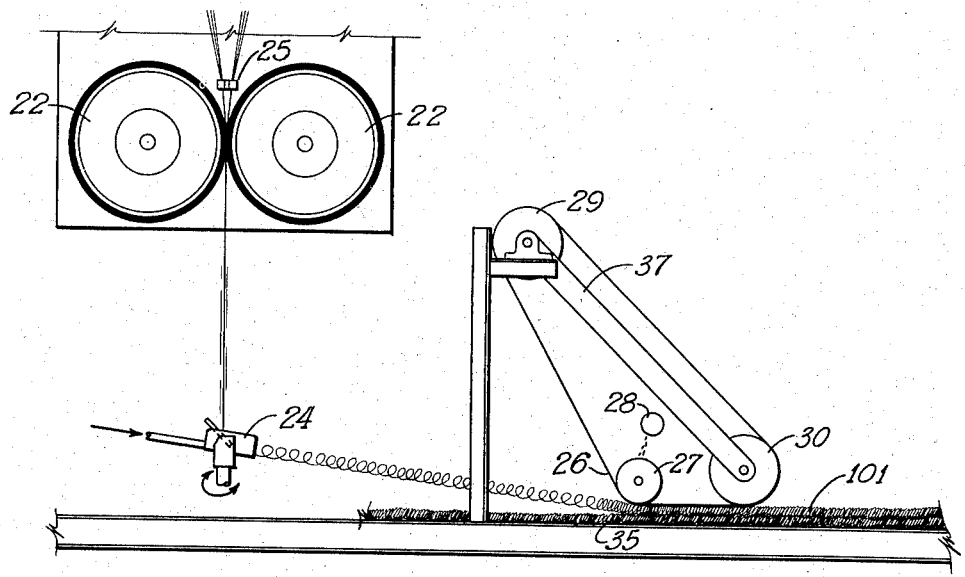
Figure 11 is a side-elevational view somewhat similar to Figure 4 but with the deflector unit lowered closer to the conveyor to produce a different type of mat product.
Figure 12:
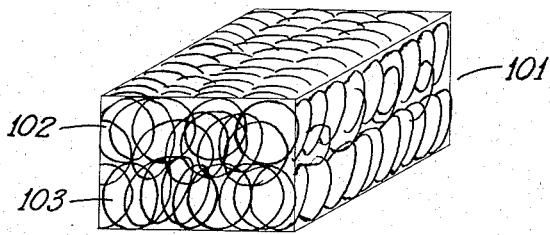
Figure 12 is an enlarged perspective view illustrative of a continuous strand mat made by the arrangement of Figure 11.

Figure 12 illustrates another type of mat product which can be made according to the present invention, wherein one or more swirls or loops of strand are deposited on the conveyor with the loops oriented generally perpendicularly to the major surfaces of the mat. Figure 11 illustrates the rearrangement of the apparatus of Figure 4 which will effect production of mats of this character. The principal difference between the arrangement of Figure 11 and Figure 4 is that in the arrangement of Figure 11 the unit 24 is disposed in a lower position closer to the conveyor 35. It has its deflector members oriented to eject a strand directly into the gap between the chain 26 at the level of the roller 27 and the level of the conveyor 35.

Although a double layer of vertically oriented strand is shown being produced in Figure 11 and having been produced in the product of Figure 12, it will be readily understood that a single layer mat product can be made in accordance with these principles. The angle of throw of the strand from the unit 24 is arranged to be smaller with respect to the plane of the conveyor so that upon impingement of the strand output of the unit 24 in the deposition zone at the gap or bight between the roll 27 and the conveyor 35, the strand loops which are in the form of an extended helix in their path of travel to the bight are collapsed, or in other words, are flattened against each other to cause the loops to accumulate in generally vertical fashion. In this respect, the swirls of strand already deposited in the mat act as backing material for the strand received in the deposition zone.

At the start-up of deposition of strand on the conveyor 35, as well as at the start-up of deposition of strand in any over-lying layers, the strand loops take on a flat horizontal configuration generally parallel to the collection surfaces underneath, because there is no back-up material against which it can be thrown. The strand is ejected from the unit 24 at a volume rate, however, such that it accumulates rapidly to build sufficient back-up portions of the mat to cause the loops received in the deposition zone to acquire their generally perpendicular orientation with respect to the collection surface. Thus, after the start-up of mat production, sufficient back-up material exists in the mat to assure that subsequently received strand will acquire the desired form.

The binder material deposited at the roll 27 in this process is much less than that in the arrangement shown in Figure 4 to prevent the loops from collapsing due to weight of the binder material. Sufficiently small quantities of binder material are here added to assure that collapse of the loops will not occur. If desired, additional binder material can be supplied in atomized form in the binder hood 43 as a fog to effect penetration.

As shown in Figure 12 the vertical swirls or loops of the strand can become slightly bowed as illustrated at the side of the perspective view of the mat. This occurs when the gap between the chain 26 and the conveyor chain 25 are spaced to slightly compress the layers already deposited to, in effect, hold them in place as back-up material for the strand being deposited. Such compression also causes downward push of the upper layer so that when more than one layer is incorporated into a mat, the layers adjacent to each other are caused to intermingle slightly in overlapping relation as illustrated. Thus, the mat 101 incorporating the layers 102 and 103 has an overlapping intermediate zone formed of the two layers which lends to promoting integrity to the two layers as a single mass by establishing an interfelted relationship between strands of the two layers. This relationship is promoted still further when the strands of the layers have their filaments dispersed. The mat product 101 therefore is slightly less in thickness dimension than the thickness of two layers added together arithmetically. Extremely thick mat products may be made by this arrangement and by way of example can be in the order of seven inches in thickness or more, if desired.

The vertical oriented loops or swirls might be termed erected loops of strand, that is, loops of strand which are oriented generally perpendicularly to the major surfaces of the product into which they are incorporated. In still another sense, the loops might be considered as laminated in vertical planes, or planes perpendicular to the major surface of the product. They are laminated perpendicularly to the major mat surfaces and across the width of the mat, but the product is provided an integrity such that after bonding the laminations no longer exist as separable strips, although the loops of strand are retained in the integral mass as perpendicularly oriented loops.

In view of the foregoing description of various applications of the present invention, it will be understood that modifications and variations may be effected in the method, apparatus and product of the present invention without departing from the scope and the novel concepts thereof.

We claim:

1. The method of introducing a fibrous strand to a product comprising the steps of imparting a high velocity axial motion to the strand, directing said strand after it leaves the motion-imparting instrumentality against a deflecting surface with sufficient velocity to deflect the strand therefrom, directing said deflected strand to a second surface, and establishing by said second surface the trajectory of the deflected strand to redirect it under the influence of its own inertia of motion to predetermined points of collection.

2. The method of introducing a fibrous strand to a product comprising the steps of imparting a high velocity axial motion to the strand, directing said strand after it leaves the motion-imparting instrumentality against a deflecting surface under the influence of the kinetic energy imparted to it by said instrumentality, deflecting said strand to a second surface, impinging the deflected strand with a gaseous blast at said second surface to impart additional kinetic energy thereto, and by said second surface operating in conjunction with said gaseous blast establishing the trajectory of the deflected strand to predetermined points of collection.

3. The method of introducing an untwisted fibrous glass strand into a product and concomitantly imparting a fuzzed condition thereto comprising the steps of imparting a high velocity motion to such strand, causing said strand to impinge a hard deflection surface with sufficient kinetic energy to effect dispersion of at least a portion of the filaments in said strand into spaced relationship at each point along its length, deflecting said strand to a second surface, and establishing by said second surface the trajectory of the deflected strand to redirect it under the influence of its own inertia of motion to predetermined points of collection.

4. The method of introducing a fibrous strand into a product comprising the steps of imparting a high velocity axial motion to the strand, driving said strand against a deflecting surface by its own kinetic energy, directing deflected strand to channelling means for establishing the path of said strand, and angularly orienting said channelling means to guide said strand to predetermined points of accumulation.

5. The method of introducing a fibrous strand to a product comprising the steps of imparting a high velocity axial motion to the strand, driving said strand against a deflecting surface by its own kinetic energy arranged to be sufficient to effect deflection from said surface, directing said deflected strand to channelling means, and establishing the trajectory of said deflected strand by said channelling means to guide said deflected strand to predetermined points of accumulation.

6. Apparatus for manufacture of mats of matter in continuous strand-like form comprising means for imparting high velocity motion to such material, a primary deflection surface angularly disposed in the path of travel of said material to effect deflection thereof, a second deflection surface disposed to receive material deflected from said primary deflection surface, and to deflect said deflected strand by its own inertia of motion a second time to predetermined points of collection.

7. Apparatus for manufacture of mats of matter in continuous strand-like form comprising means for imparting a high velocity motion to a continuous strand, a deflection unit having a primary deflecting surface disposed in the path of travel of said strand, said motion imparting means being capable of moving said strand in an axial direction with sufficient velocity to effect a deflection thereof from said primary deflection surface under the influence of its own inertia of motion, a second deflection surface disposed in the path of travel of said deflected strand, and means for cyclically varying the orientation of said primary and secondary deflection surfaces relative to the path of said strand to effect distribution thereof in accordance with a predetermined sweep pattern.

8. Apparatus for manufacture of mats of matter in continuous strand-like form comprising means for imparting high velocity motion to such material, a primary deflection surface angularly disposed in the path of travel of said material, a second deflection surface disposed to receive material deflected from said primary deflection surface and to effect a second deflection of said deflected material, and pneumatic blower means directed across said second surface to aid movement therefrom of the material deflected for a second time.

9. Apparatus for manufacture of mats of continuous strands comprising means for imparting high velocity axial motion to such material, a primary deflection surface angularly adjustable in the path of travel of said material, a secondary angularly adjustable deflection surface disposed to receive material deflected from said primary deflection surface, said motion-imparting means being capable of moving said strand with sufficient velocity to deflect it in sequence from said primary and secondary deflection surfaces, an overhanging preliminary-collection surface disposed to receive the material deflected from said second surface, said overhanging preliminary collection surface being inclined downwardly and away from said secondary deflection surface, and a generally horizontally movable conveyor surface disposed under said overhanging surface for receipt of material dropped from said overhanging surface.

10. Apparatus for manufacture of mats of continuous strands comprising means for imparting high velocity axial motion to such material, an angularly adjustable first deflection surface in the path of travel of said material, a second angularly adjustable deflection surface disposed to receive material deflected from said first deflection surface, said surfaces and motion-imparting means being operably arranged to deflect said strand in sequence from said first and second deflection surfaces, said surfaces being mounted for pivotal motion about a common axis and means for oscillating said surfaces about said axis to effect a sweep distribution of material deflected from said second surface.

11. Apparatus for manufacture of mats of matter in continuous strand-like form comprising means for imparting a generally horizontal motion to a strand, means for cyclically varying the direction in which said strand is directed generally about a given point, a flat guide surface against which said strand is introduced and over which the strand is moved in intimate engagement with said guide surface in its cyclic path of movement, said surface having a straight edge from which said strand leaves said surface, and a collection surface disposed under said guide surface, said guide surface being oriented with said straight edge extending in a direction transverse and generally parallel to said collection surface to guide said strand for deposition in a generally straight line path across said collection surface.

12. A mat comprising a continuous strand collected in the form of a plurality of loops in an extended layer, said loops being oriented in said layer in flattened form generally perpendicular to a major surface of said layer.

13. A mat comprising a continuous strand collected in the form of a plurality of loops in an extended layer, said loops being oriented in successive rows flattened against each other and extending transversely to said layer in one direction.

14. A mat comprising a continuous strand collected in the form of a plurality of loops in an extended layer, said loops being oriented in successive rows flattened against each other and extending transversely to said layer in one direction, said flattened rows being oriented on edge generally perpendicular to the major surfaces of said mat.

15. A mat comprising a plurality of continuous strands collected in the form of loops, the loops of each of said strands being collected generally in a different layer of said mat and being oriented in successive rows flattened against each other, each said flattened row extending transversely to said mat in one direction and being oriented on edge generally perpendicular to the major surfaces of said mat.

16. A mat comprising a plurality of continuous strands collected in the form of loops, the loops of each of said strands being collected generally in a different layer of said mat and being oriented in successive rows flattened against each other, each said flattened rows extending transversely to said mat in one direction and being oriented on edge generally perpendicular to the major surfaces of said mat, the loops of strand of each pair of adjacent layers of said mat intermingling with each other forming an intermediate zone of the strands of the adjacent pair of layers.

17. A mat comprising an untwisted strand of continuous filaments, said strand being collected in the form of a plurality of loops in an extended layer, said strand having at least a portion of the filaments at each point along its length in said loops dispersed in spaced relation from each other, said loops of strand being oriented in flattened upstanding relation generally perpendicular to the major surfaces of said layer.

18. The method of making a mat comprising depositing a continuous strand on a collection surface as a series of loops, depositing said loops as a relatively flat strip on edge with the loops in generally overlapping relationship, depositing successive portions of said strand into similar flattened strips of loops in edge-oriented relationship on said collection surface and against said strip, and compacting said successive strips of loops in generally parallel relationship into an integral mass with said strip.

19. The method of making a strand mat product comprising imparting a generally helical form to a strand flattening said helical form into a strip of overlapping loops, orienting said strip on edge, collecting successive portions of said strand into similar strips, and similarly orienting said strips on edge in successive adjacent rows in compacted relationship against each other.

20. The method of making a mat comprising arranging a continuous strand into a longitudinal relatively flat strip of overlapping loops, orienting said strip of loops generally on edge, depositing successive portions of said strand as relatively flat edge-oriented loops in similar strips, and arranging said strips in generally parallel relation with said strip, and compacting successive loops in each such strip against the loops in the immediately preceding strip of loops.

21. The method of making a strand mat product comprising arranging each of a plurality of continuous strands into a series of loops in a relatively flat strip of overlapping loops, depositing a layer of said strips on edge on a collection surface in generally parallel and compacted relationship, depositing a second layer of said strips on edge over said first layer also in generally parallel and compacted relationship, and supplying a binder material to said mat to interbond the loops of said strips in both said layers into an integrated mass.

22. The method of making a strand mat product of strand of untwisted continuous filaments comprising dispersing at least a portion of the filaments of a strand at each point along its length, arranging said strand into a longitudinal relatively flat strip of overlapping loops, orienting said strip of loops generally on edge, depositing successive portions of said strand as relatively flat edge-oriented loops in similar strips and compacting all such strips together in face-to-face generally parallel relation.

23. Apparatus for manufacture of mats of material in the form of continuous strands comprising means for imparting generally horizontal axial motion to a strand, a primary collection surface movable to carry away accumulations of strand deposited thereon, and a collection surface overhanging said primary collection surface, said overhanging collection surface extending at an incline downwardly away from said motion-imparting means and being continuously movable downwardly in its plane of disposition, said overhanging and primary collection surfaces being arranged to receive therebetween strand accumulations from said motion-imparting means, said overhanging collection surface being movable at a rate matched to the rate of said primary collection surface to carry away accumulations of strand deposited between said collection surfaces.

References Cited in the file of this patent

UNITED STATES PATENTS

| | | |
|---|---|---|
| 2,577,214 | Slayter | Dec. 4, 1951 |
| 2,610,893 | Collins et al. | Sept. 16, 1952 |
| 2,638,146 | Rounseville et al. | May 12, 1953 |
| 2,728,699 | Labino | Dec. 27, 1955 |
| 2,736,676 | Frickert | Feb. 28, 1956 |